United States Patent [19]

Okayama et al.

[11] Patent Number: 5,237,452
[45] Date of Patent: Aug. 17, 1993

[54] WAVELENGTH-SELECTIVE PHASE-GRATING OPTICAL LOW-PASS FILTER

[75] Inventors: Hiroaki Okayama, Hirakata; Shusuke Ono, Takatsuki, both of Japan

[73] Assignee: Matsushita Electric Industrial Co., Ltd., Osaka, Japan

[21] Appl. No.: 943,393

[22] Filed: Sep. 10, 1992

[30] Foreign Application Priority Data

Sep. 10, 1991 [JP] Japan ................. 3-230156

[51] Int. Cl.$^5$ .............................................. G02B 27/46
[52] U.S. Cl. ................................... 359/574; 359/576
[58] Field of Search ............... 359/566, 568, 569, 574, 359/576

[56] References Cited

U.S. PATENT DOCUMENTS

| | | | |
|---|---|---|---|
| 3,821,795 | 6/1974 | Okano | 359/569 |
| 3,911,479 | 10/1975 | Sakurai . | |
| 4,093,346 | 6/1978 | Nishino et al. . | |
| 4,178,611 | 12/1979 | Okano . | |
| 4,795,236 | 1/1989 | Ise | 359/569 |
| 4,998,801 | 3/1991 | Shiraishi et al. | 359/885 |

FOREIGN PATENT DOCUMENTS

| | | |
|---|---|---|
| 0186166 | 7/1986 | European Pat. Off. . |
| 0454409 | 10/1991 | European Pat. Off. . |
| 61-149923 | 7/1986 | Japan . |
| 2-132413 | 5/1990 | Japan . |

OTHER PUBLICATIONS

R. L. Townsend, "Spatial-Frequency Filter for a Kel-1-Type Color Camera", *Applied Optics*, Nov. 1992, vol. 11, No. 11, pp. 2463-2472.

Gerritsen et al., "Transmission Diffraction Gratings Comnposed of One Material With Anonalous Dispersion in the Visible Region", *Applied Optics*, vol. 27, No. 13, Jul. 1, 1988 pp. 2781-2785.

European Search Report for EPO 92115321.9.

*Primary Examiner*—Bruce Y. Arnold
*Assistant Examiner*—J. P. Ryan
*Attorney, Agent, or Firm*—Ratner & Prestia

[57] ABSTRACT

A wavelength-selective phase-grating optical low-pass filter has a phase difference structure formed at a boundary face between two layer materials which have different refractive index distributions and an identical refractive index at an intended wavelength. A trapezoid form is adopted at the phase difference section of the phase grating to achieve an excellent MTF characteristic in the condition of:

$$0.1 < a/\Lambda < 0.9$$
$$0.1 < b/\Lambda < 0.9$$

[Equation 1]
$$\frac{\frac{1}{2} - \frac{4f\lambda Rd}{\Lambda}}{\frac{1}{2} - \frac{4f\lambda Bd}{\Lambda}} < \left(\frac{NR}{NB}\right)^2 < \frac{2 - \frac{4f\lambda Rd}{\Lambda}}{1 - \frac{4f\lambda Bd}{\Lambda}}$$

thereby obtaining a wavelength-selective phase-grating optical low-pass filter capable of adjusting the cutoff characteristic and improving the characteristic in the low-frequency region of the spatial frequency.

4 Claims, 5 Drawing Sheets

WAVELENGTH-SELECTIVE PHASE-GRATING OPTICAL LOW-PASS FILTER

BACKGROUND OF THE INVENTION

1. Field of the Invention

The present invention relates to an optical low-pass filter for use in an optical system such as a single-tube color video camera or a color video camera employing a solid-state image sensor having a color separation filter.

2. Description of the Prior Art

Generally in a video camera or the like employing a solid-state image pickup element, a subject image focused on the image pickup element is spatially and discontinuously sampled to obtain output image data. In the above case, when the optical data of the subject has spatial frequency components which are higher than the spatial sampling frequency of the image pickup element, the output image data generated from the solid-state image pickup element contains data of a configuration or phantom data which is not included in the subject data.

In other words, such frequency components higher than the Nyquist frequency which cannot be picked up by the solid-state image pickup element are output in the form of phantom data such as aliasing components, Moire, and phantom color.

For the above reason, in an image pickup system, there has been employed a conventional practice of limiting such high spatial frequency components of a subject to be input to the solid-state image pickup element by arranging an optical low-pass filter in the image pickup system. For the above-mentioned purpose, the optical low-pass filter has been made utilizing a crystal plate having a birefringence characteristic or recently utilizing a phase grating. However, any conventional optical low-pass filter has been intended for obtaining a low-pass effect generally equal at every wavelength in the entire components.

Considering the case that the entire transmission wavelength band of a color separation filter used in a recent single plate type image pickup system is separated regarding to every wavelength band of three color components (primaries) of R, G, and B, the following technique attempt has been put into practice taking advantage of the fact that the spatial distribution density, i.e., the spatial frequency of each color separation filter is different at every transmission wavelength band. The technique is that a wavelength band having a distribution of higher spatial frequencies is subjected to sampling at a relatively higher sampling frequency and a wavelength band having a distribution of lower spatial frequencies is subjected to sampling at a relatively lower sampling frequency to obtain appropriate image data.

In order to satisfy the above-mentioned requirements, the optical low-pass filter employed in the optical system is required to have different cutoff frequency characteristics in respect of different wavelength bands. A basic structure for attaining the above-mentioned purpose has been described in the Japanese Patent Laid-Open Publication No. Hei-2-113302. In this conventional wavelength-selective phase-grating optical low-pass filter, a phase difference is constructed in a form of a triangular wave form at a boundary face between two materials which have different refractive index distributions and an identical refractive index at an intended wavelength. In recent years, however, since the size of the image pickup element is attempted to be miniaturized, therefore the cutoff spatial frequency becomes higher. In the conventional structure having a phase difference of a triangular wave form, when in attempt of obtaining a low-pass effect at a higher spatial frequency, it was found as the result of the analysis that there is no solution having an appropriate format. According to the study of the analysis of the phase difference form, it was found it necessary that the materials to be used therefor should satisfy a specific condition in constructing the improved optical low-pass filter.

SUMMARY OF THE INVENTION

Accordingly, the object of the present invention is to provide a condition for designing an optical low-pass filter having different cutoff frequencies at different wavelength bands while assuring an excellent frequency characteristic.

The basic theory of the present invention is to construct a wavelength-selective phase-grating optical low-pass filter by providing a phase difference structure at a boundary face between at least two materials which have different refractive index distributions and an identical refractive index at an intended wavelength.

In contrast to the fact that the conventional wavelength-selective phase-grating filter described in the Japanese Patent Laid-Open Publication No. Hei-2-113302 has a triangular wave form at the phase difference section as a basic construction, while the present invention adopts a trapezoid form at the phase difference section of the phase grating in order to achieve the above-mentioned object. By constructing the trapezoid form so that it satisfies the following conditions for optimization, an excellent MTF (Modulation Transfer Function) characteristic can be achieved. The conditions are as follows:

$$0.1 < a/\Lambda < 0.9$$
$$0.1 < b/\Lambda < 0.9$$

[Equation 1]
$$\frac{\frac{1}{2} - \frac{4f\Lambda Rd}{\Lambda}}{\frac{1}{2} - \frac{4f\Lambda Bd}{\Lambda}} < \left(\frac{NR}{NB}\right)^2 < \frac{2 - \frac{4f\Lambda Rd}{\Lambda}}{1 - \frac{4f\Lambda Bd}{\Lambda}}$$

where "a" represents the width of the top flat portion of the trapezoid, "b" represents the width of the bottom flat portion of the trapezoid, "h" represents the height of the phase difference section, "f" represents the spatial cutoff frequency, "$\Lambda$" represents a pitch of the phase grating, "$\lambda d$" represents the reference wavelength at which the refractive index is identical between the two layers, "d" represents the distance between the phase grating filter and the image surface, "$\lambda R$" represents a center wavelength of the red wavelength band, "$\lambda B$" represents a center wavelength of the blue wavelength band, "NR" represents the refractive index difference between the layer on the subject side and the layer on the image surface side at the center wavelength $\lambda R$, and "NB" represents the refractive index difference between the layer on the subject side and the layer on the image surface side at the center wavelength $\lambda B$.

As described above, according to the present invention, by providing a phase-grating optical low-pass filter composed of a plurality of phase gratings which have, at a specific (reference) wavelength, an identical refractive index and different refractive index distributions in an image pickup system of such as a video camera employing a solid-state image pickup element, there can be obtained a wavelength-selective phase-grating optical low-pass filter capable of adjusting the cutoff characteristic and improving the characteristic in the low-frequency region of the spatial frequency.

Furthermore, by employing a wavelength-selective phase-grating optical low-pass filter of the present invention in the optical system and setting the cutoff frequency of G color component to be higher than those of R and B color components, an image pickup system having an appropriate resolution can be constructed.

According to the feature of the present invention, since the boundary surface of the phase difference portion in the phase grating filter have a trapezoid form, there can be obtained an MTF characteristic of the filter more excellent than that of a conventional wavelength-selective phase-grating filter which has a rectangular waveform at a phase difference portion.

Moreover, by adopting the construction of the present invention, the structure of the phase grating for generating a phase difference can be made to have a degree of freedom while achieving a desired appropriate MTF characteristic.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
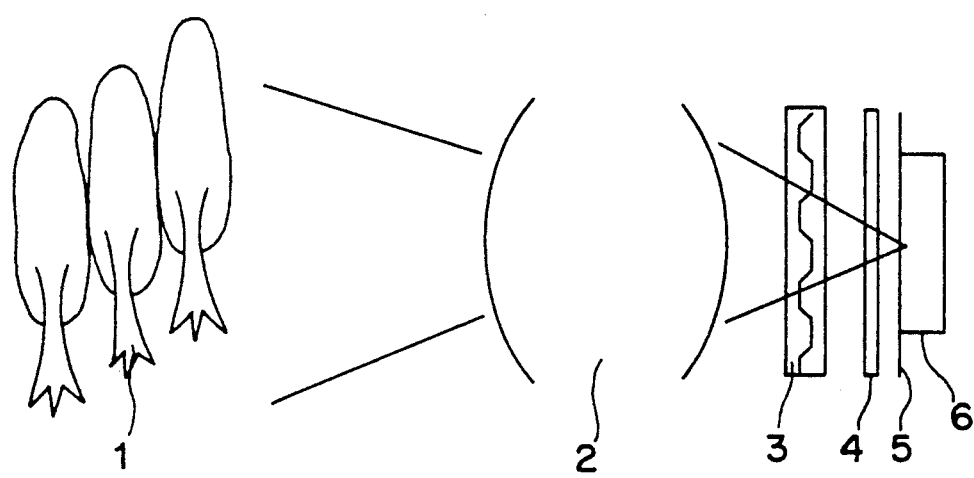
FIG. 1 is a schematic view showing an exemplified arrangement of an optical system employing a wavelength-selective phase-grating optical low-pass filter in accordance with the present invention.

FIG. 1 shows an exemplified arrangement of an optical system employing a wavelength-selective phase-grating optical low-pass filter in accordance with the present invention.

Referring to FIG. 1, designated by reference numeral 1 is a subject, numeral 2 is a lens system, numeral 3 is a wavelength-selective phase-grating optical low-pass filter which is disposed between the lens system 2 and a color separation filter 4. The optical low-pass filter 3 has different diffraction characteristics in different wavelength bands. Reference numeral 5 denotes an image surface located on an image pickup element 6 on which an image of the subject 1 is formed through the lens system 2. It is noted that the position of the wavelength-selective phase-grating optical low-pass filter 3 is not limited to the position of the present embodiment and the wavelength-selective phase-grating optical low-pass filter 3 may be disposed in the lens system 2 or in front of the lens system 2 to provide the same effect so long as the filter is disposed between the subject 1 and the image surface 5.

In the arrangement shown in FIG. 1, the image of the subject 1 is focused on the image surface 5 of the image pickup element 6 by means of the lens system 2, while the light data of the subject 1 is color-separated with respect to the primary colors through the color separation filter 4 and filtered through the wavelength-selective phase-grating optical low-pass filter 3. Thus, the image of the subject 1 has different spatial frequency transmission characteristics at each different wavelength band by the operation of the phase-grating optical low-pass filter 3 having different diffraction characteristics at different wavelength bands when being focused on the image pickup element 6. In the above case, however, the frequency characteristic of the phase-grating optical low-pass filter 3 has no cutoff frequency with respect to the green wavelength band to allow the green color component to pass therethrough only with the phase-grating optical low-pass filter 3 of the present invention. Therefore, it is necessary to concurrently use another optical low-pass filter or to provide a low-pass filter having a green color component cutoff characteristic on the phase-grating optical filter of the present invention.

Figure 2:
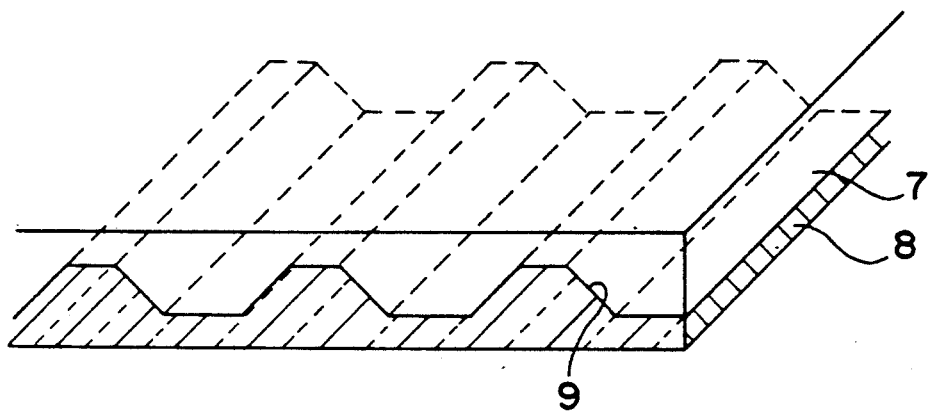
FIG. 2 is a schematic view of the wavelength-selective phase-grating optical low-pass filter of the present invention.

Referring to FIG. 2 which shows a structure of a phase-grating, reference numeral 7 indicates a first layer located in the side of the subject, numeral 8 indicates a second layer located in the side of the image surface, and numeral 9 indicates a boundary surface between the first layer 7 and the second layer 8 having a phase difference waveform for generating a phase difference. In constructing the present wavelength-selective phase-grating optical low-pass filter, it can be selected to use an adhesive, resin, or the like material as a filler at the boundary surface 9 between two adjoining layers 7 and 8.

Figure 3:
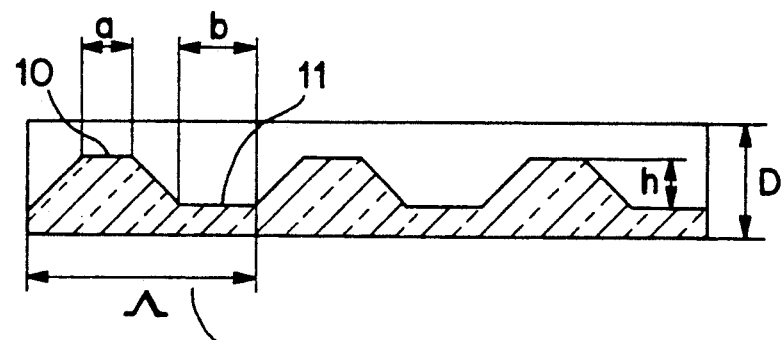
FIG. 3 is a sectional view of a phase difference portion of FIG. 2.

FIG. 3 shows the section form of the phase-grating boundary surface of the phase difference portion for generating a phase difference, where reference numeral 10 indicates a top flat portion having its width of "a", numeral 11 indicates a bottom flat portion having its width of "b", and "h" represents the height of the phase difference section, "D" represents the thickness of the phase grating, and numeral 12 indicates a cycle Λ of the phase difference portion. In this embodiment, the size of the phase-grating is designed in such a manner that "a" = "b" are set to approximately 250 μm, "Λ" is set to approximately 1000 μm, and "h" is set to approximately 97 μm. Any value of "D" can be selected so long as "D" is sufficiently larger than "h". It is noted that "a", "b", "h" and "Λ" are not limited to these values and any appropriate values are available.

When these values of the parts satisfy Equations 2, 3, and 4 as follows, the optimum condition for designing an optical low-pass filter having different cutoff frequencies at different wavelength bands can be obtained while assuring an excellent frequency characteristic:

[Equation 2]
$$\frac{\frac{1}{2} - \frac{4f\lambda Rd}{\Lambda}}{\frac{1}{2} - \frac{4f\lambda Bd}{\Lambda}} < \left(\frac{NR}{NB}\right)^2 < \frac{2 - \frac{4f\lambda Rd}{\Lambda}}{1 - \frac{4f\lambda Bd}{\Lambda}}$$

[Equation 3]
$$\frac{1}{4\lambda Bf} < \frac{d}{\Lambda} < \frac{1}{4\lambda Rf}$$

[Equation 4]
$$\left(\frac{NR}{NB}\right)^2 < \frac{\frac{\lambda R}{\lambda B} - 4f\lambda R\left(\frac{d}{\Lambda}\right)}{\frac{\lambda R}{\lambda B} - 4f\lambda B\left(\frac{d}{\Lambda}\right)}$$

The following describes the procedure for obtaining the Equations 2, 3 and 4 as the optimum condition of the phase-grating optical low-pass filter. Assuming that, a parameter $\xi = \lambda df$, $\phi$ represents a phase difference, the OTF (Optical Transfer Function) characteristic which is obtained by adding phase data to MTF is represented by Equation (I) as follows:

$$H(\xi) = (1/2 - 2\xi/\Lambda)[\cos(2\phi 2\xi/\Lambda) + 1] + \quad \text{[Equation I]}$$
$$(1/\phi)\sin(2\phi 2\xi/\Lambda) \quad (0 \leq \xi \leq \Lambda/4) \text{ or}$$
$$(2\xi/\Lambda - 1/2)\cos\phi - [\sin\{2\phi(2\xi/\Lambda - 1/2)\} - 2\sin\phi]/(2\phi)$$
$$(\Lambda/4 \leq \xi < \Lambda/2)$$

Herein, assuming that $n_1$ represents the refractive index of the subject side layer, $n_2$ represents the refractive index of the image side layer, the phase difference $\phi$ is represented by $\phi = (2\pi h/\lambda)(n_1 - n_2)$ Herein, by replacing $N = (n_1 - n_2)$ and $A = 4\pi dh/\Lambda$, Equation I is represented by Equation II as follows:

$$H(f) = (1/2 - 2d\lambda f/\Lambda)[\cos(2ANf) + 1] + \quad \text{[Equation II]}$$
$$(\lambda/2\pi hN)\sin(2ANf) \quad (0 \leq \xi \leq \Lambda/4) \text{ or}$$
$$(2d\lambda f/\Lambda - 1/2)\cos(2\pi hN/\Lambda) -$$
$$\{\sin(2ANf - 2\pi hN/\Lambda) - 2\sin(2\pi hN/\Lambda)\}/(4\pi hN/\Lambda)$$
$$(\Lambda/4 \leq \xi < \Lambda/2)$$

Herein, the OTFs in respect of the primaries R and B are obtained as follows:

(i) In the range of $(0 \leq \xi \leq \Lambda/4)$, OTF(R) and OTF(B) are respectively represented by equations:

$$H_R(f) = [1/2 - (2\pi df/\Lambda)\lambda_R][\cos(2AN_Rf) + 1] +$$
$$(\lambda_R/2\pi hN_R)\sin(2AN_Rf)$$
$$H_B(f) = [1/2 - (2\pi df/\Lambda)\lambda_B][\cos(2AN_Bf) + 1] +$$
$$(\lambda_B/2\pi hN_B)\sin(2AN_Bf)$$

The difference between OTF(R) and OTF(B) is accordingly represented as follows:

$$H_R(f) - H_B(f) = 1/2[\cos(2AN_Rf) - \cos(2AN_Bf)] -$$
$$(2df/\Lambda)[\{\lambda_R\cos(2AN_Rf) - \lambda_B\cos(2AN_Bf)\} +$$
$$(\lambda_R - \lambda_B)] + (1/2\pi h)[(\lambda_R/N_R)\sin(2AN_Rf) -$$
$$(\lambda_B/N_B)\sin(2AN_Bf)]$$

The above equation is approximately developed as follow:

$$H_R(f) - H_B(f) = (Af)^2[N_R^2\{(4df/\Lambda)\lambda_{R-1}\} - N_B^2\{(4df/\Lambda)\lambda_{B-1}\}] \quad (0 \leq \xi \leq \Lambda/4)$$

(ii) In the range of $(\Lambda/4 \leq \xi < \Lambda/2)$, the difference between OTF(R) and OTF(B) is represented as follows:

$$H_R(f) - H_B(f) = (\pi h)^2[(N_R/\lambda_R)^2 - (N_B/\lambda_B)^2] +$$
$$(2df/\Lambda)(\lambda_R - \lambda_B) - (4df/\Lambda)(\pi h)^2[(N_R/\lambda_R)^2 -$$
$$(N_B/\lambda_B)^2] - (\Lambda f/2\pi h)(\lambda_R - \lambda_B)$$
$$= (\pi h)^2[\{(N_R/\lambda_R)^2 - (N_B/\lambda_B)^2\} -$$
$$(4df/\Lambda)\{(N_R/\lambda_R)^2 - (N_B/\lambda_B)^2\}]$$
$$(\Lambda/4 \leq \xi < \Lambda/2)$$

In the range of $(0 \leq \xi \leq \Lambda/4)$, when the condition of $H_R(f) = H_B(f)$ is set, $$H_R(f) - H_B(f) = 0$$

Accordingly, Equation III is obtained as follows:

$$\text{[Equation]} N_R^2\{(4df/\Lambda)\lambda_{R-1}\} - N_B^2\{(4df/\Lambda)\lambda_{B-1}\} = 0$$

In the range of $(\Lambda/4 \leq \xi \leq \Lambda/2)$, when the condition of $H_R(f) = H_B(f)$ is set, $$H_R(f) - H_B(f) = 0$$

$$\{(N_R/\lambda_R)^2 - (N_B/\lambda_B)^2\} - (4df/\Lambda)\{(N_R/\lambda_R)^2 - (N_B/\lambda_B)^2\} = 0$$

Accordingly, Equation IV is obtained as follows:
[Equation IV]

$$(N_R/N_B)^2 = \{\lambda_R/\lambda_B - (4df/\Lambda)\lambda_R\}/\{\lambda_B/\lambda_R - (4df/\Lambda)\lambda_B\}$$

Figure 4:
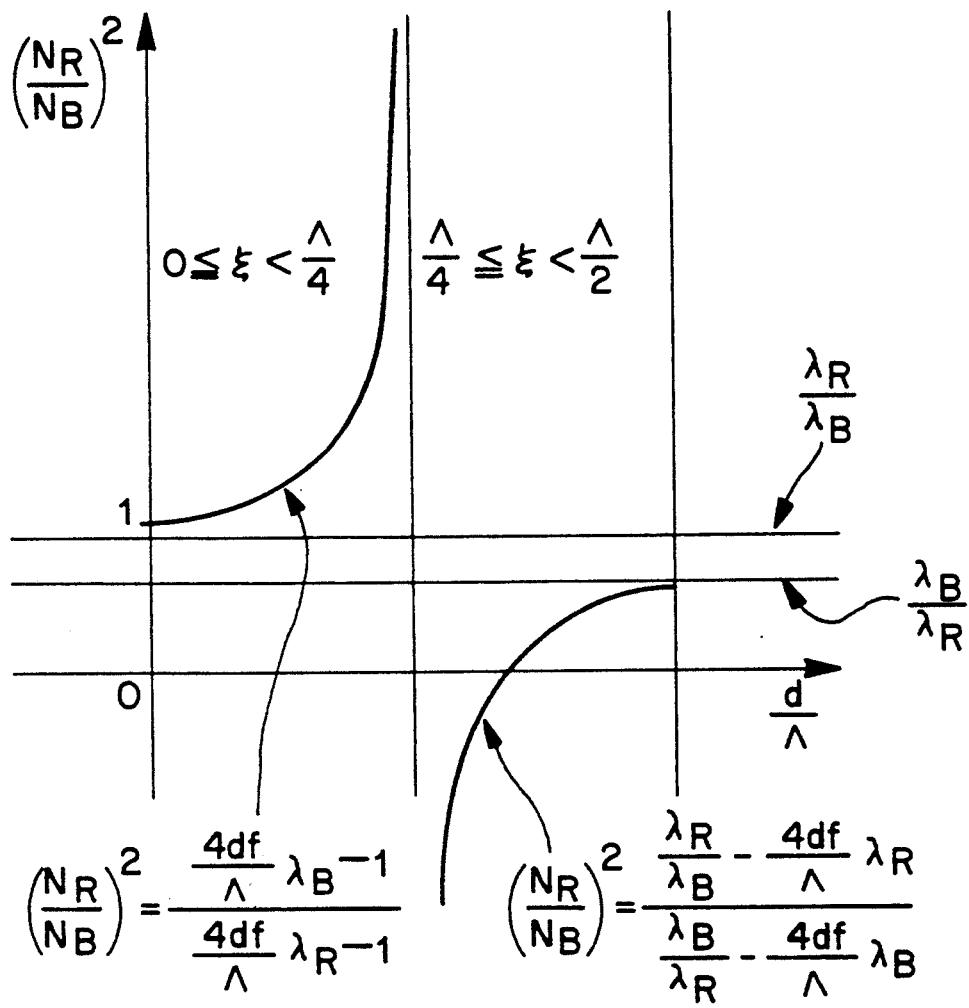
FIG. 4 is a graph for obtaining an optimum condition in the present embodiment.

From Equations III and IV, a graph showing the relationship between $(N_R/N_B)^2$ and $d/\Lambda$ is depicted as shown in FIG. 4.

Herein, the range to have a solution of the Equations III and IV is obtained as follows:

From the range of $(\Lambda/4 \leq \xi < \Lambda/2)$, when the range satisfies Equation IV, each value of $\lambda_R$, $\lambda_B$ is not limited to one point. Although the relation between the wavelength bands of R and B components is represented by $\lambda_R \geq \lambda_B$, in the typical NTSC (National Television System Committee) color television, the wavelength bands of R and B have wide ranges. Therefore, when considering a visible region (350 nm to 700 nm), the available range is represented as follows:

$$\tfrac{1}{2} < \lambda_B/\lambda_R < 2$$

Accordingly, Equation 2 is obtained. From the graph shown in FIG. 4, by replacing $\xi = \lambda df$ in the range of $(\Lambda/4 \leq \xi < \Lambda/2)$ having a solution, Equation 3 can be obtained.

Since the present embodiment takes advantage of the fact that distribution of the green wavelength band components are the most of all the wavelength bands, for example, in an ordinary single plate or single tube image pickup system and that a higher sampling frequency for the green wavelength band is used in comparison with the sampling frequencies for the red and blue wavelength bands, the cutoff frequency of the green wavelength band is set higher than those of the red and blue wavelength bands. Consequently, the green color components exist most to exert the greatest influence on determining the resolution when synthesizing a brightness signal as described above, and therefore the green wavelength band components can be effectively used.

Accordingly, assuming that the refractive index $n_{1d}$ of the layer on the side of the subject is 1.56907 with respect to D-lines, the Abbe's number vd of the foregoing is 71.3, while the refractive index $n_{2d}$ of the layer on the side of the image surface is 1.56732 with respect to D-lines, and that the Abbe's number vd of the foregoing is 42.8; MTF characteristic curves as shown in FIG. 5 are obtained on condition of Equations 3, 4 and 5 as follows:

$$h = \frac{1}{\pi} \sqrt{\frac{\left(\frac{1}{NB}\right)^2 \frac{1}{\lambda B} - \left(\frac{1}{NR}\right)^2 \frac{1}{\lambda R}}{\frac{1}{\lambda R} - \frac{1}{\lambda B}}}$$
[Equation 5]

where f represents the spatial cutoff frequency, $\lambda R$ represents the center wavelength of R band, $\lambda B$ represents the center wavelength of B band, d represents the distance from the phase-grating filter of the present invention to the image surface, $\Lambda$ represents the pitch of the phase-grating filter of the present invention, NR represents the refractive index difference between the two layers at the center wavelength of R band, NB represents the refractive index difference between the two layers at the center wavelength of B band, h represents the height of the trapezoid constituting the boundary surface between the two layers, and $\pi$ represents the ratio of the circumference of a circle to its diameter. It is noted that no influence is exerted on the performance when changing the order of the two layers in the present embodiment. Moreover, it is noted that, in a wavelength-selective phase-grating optical low-pass filter of the present invention, the phase difference structure between the adjoining two layers may have an island-like form.

Figure 5:
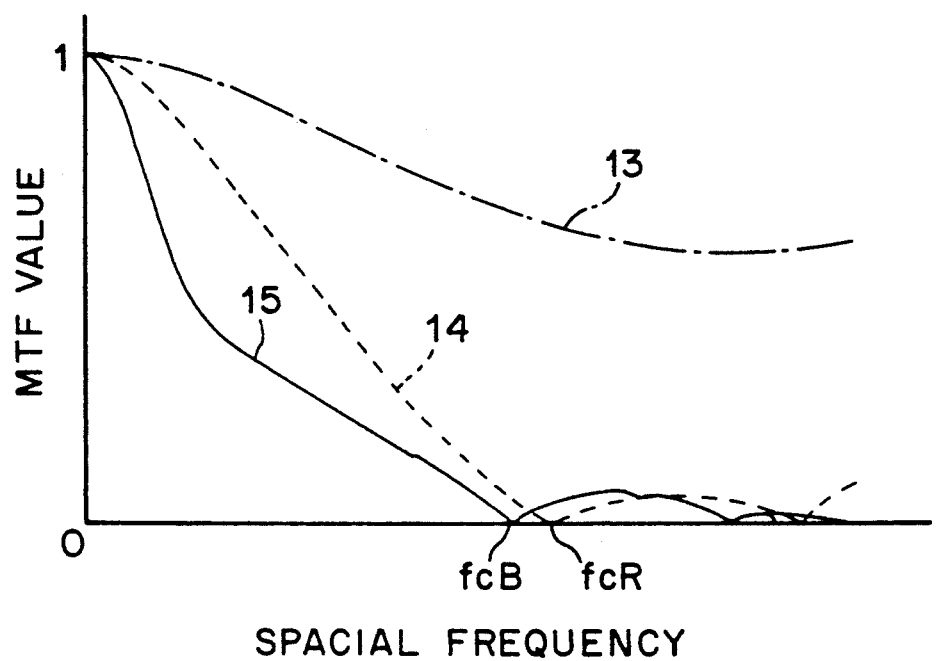
FIG. 5 is a graph of MTF characteristic curves at each wavelength band of the wavelength-selective phase-grating optical low-pass filter of the present invention.

Referring to FIG. 5, a one-dot chain line 13 indicates an MTF characteristic curve of the optical low-pass filter at a green wavelength band, a broken line 14 indicates an MTF characteristic curve at a red wavelength band, and a solid line 15 indicates an MTF characteristic curve at a blue wavelength band. On the other hand, fcR represents the cutoff frequency of the red wavelength band, and fcB represents the cutoff frequency of the blue wavelength band. As apparent from FIG. 5, the cutoff frequency of the green wavelength band is sufficiently high, while the cutoff frequencies of the red and blue wavelength bands have approximately the same spatial frequencies.

Figure 6:
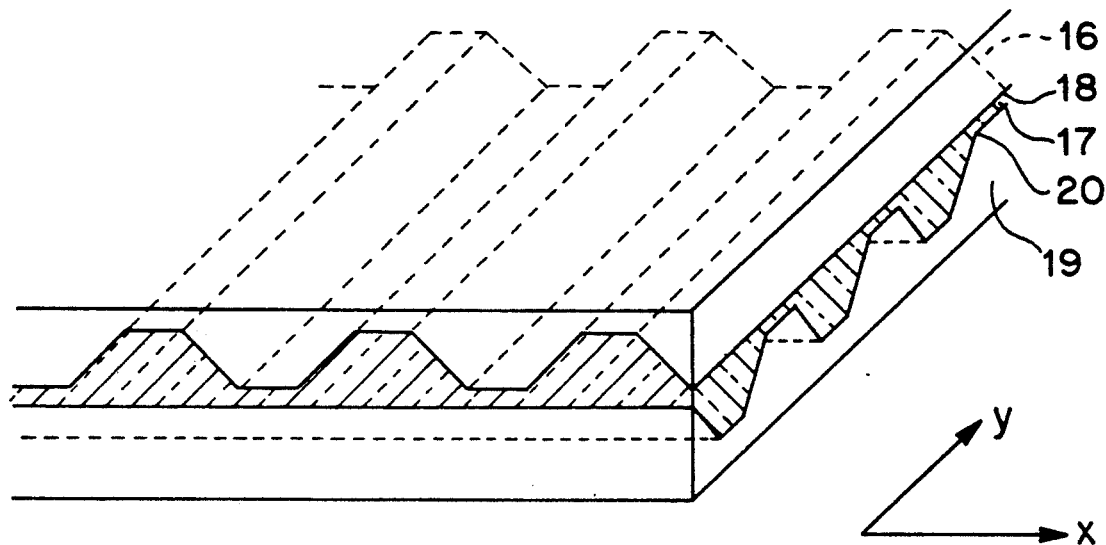
FIG. 6 is a schematic view of a modified example having a wavelength-selective phase-grating optical filter constructed of three layers where the middle layer has its both surfaces serving as boundary surfaces having a phase difference arrangement.

FIG. 6 shows a modified example of a wavelength-selective phase-grating optical low-pass filter constructed of three layers in accordance with the present invention. In regard of two boundary surfaces of the above-mentioned low-pass filter, a phase difference is generated unidimensionally in x direction as shown in FIG. 6 at a boundary surface 18 between a upper layer 16 on the side of the subject and the next middle layer 17, while another phase difference is generated unidimensionally in y direction at a boundary surface 20 between a lower layer 19 on the side of the image surface and the middle layer 17. In this modified example, since the direction of the first phase difference section formed at the boundary 18 meets at right angles to the direction of the second phase difference section formed at the boundary 20, therefore the wavelength-selective low-pass effect can be obtained with respect to the entire part of a two-dimensional image.

Figure 7:
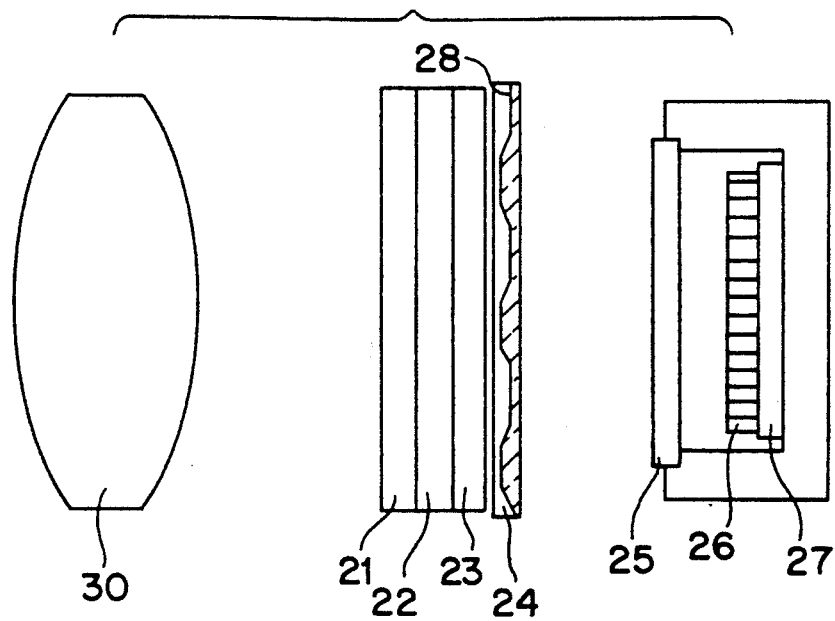
FIG. 7 is a schematic view showing an exemplified optical system having an improved horizontal resolution.

FIG. 7 shows an exemplified optical system for obtaining a doubled horizontal resolution by employing the wavelength-selective phase-grating optical low-pass filter of the embodiment of the present invention. In FIG. 7, reference numeral 30 denotes a lens system, and numeral 21 denotes an optical low-pass filter which has a low-pass effect in the vertical direction at a frequency one half of the Nyquist frequency of the solid-state image pickup element. Numeral 22 denotes an optical low-pass filter which has a low-pass effect in the horizontal direction at the Nyquist frequency of the solid-state image pickup element. Numeral 23 denotes an infrared cut filter, and numeral 24 denotes a wavelength-selective phase-grating optical low-pass filter. It is noted that the vertical and horizontal optical low-pass filters 21 and 22, infrared cut filter 23, and phase-grating optical low-pass filter 24 may be arranged in an arbitrary order and arbitrarily reversed. It is of course more effective to insert a wavelength plate before each optical low-pass filter.

Numerals 25, 26, and 27 in FIG. 7 denote respectively a protection glass of a solid-state image pickup element, a primary color separation filter, and solid-state image pickup element. The optical system in the present embodiment has a wavelength selectivity only in the horizontal direction to enhance the resolution in the horizontal direction, while the wavelength-selective phase-grating optical low-pass filter has its low-pass effect only in the horizontal direction. The optical low-pass filters 21 and 22 are provided other than the wavelength-selective phase-grating optical low-pass filter for the purpose of reducing G color components passing in the horizontal direction without being influenced by the low-pass effect as well as high-frequency components in the vertical direction. It is noted that the horizontal and vertical resolutions can be enhanced by applying the wavelength-selective phase-grating optical low-pass filter 24 two-dimensionally. In constructing the present wavelength-selective phase-grating optical low-pass filter, it can be selected to use an adhesive, resin, or the like material as a filler 28 between two adjoining layers.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A wavelength-selective phase-grating optical low-pass filter composed of at least first and second two layers made of different materials stacked to each other in a form for generating a phase difference distribution at the boundary surface between said at least two layers, said wavelength-selective phase-grating optical low-pass filter having different optical low-pass filter effects in different wavelength bands by satisfying the conditions:

(1) the refractive indexes (N1, N2) of the adjoining two materials of said at least two layers satisfy at a wavelength $\lambda$:

$N1(\lambda) = N2(\lambda)$ and $$vd1 < vd2 \text{ or } vd1 > vd2$$

provided that λ is 470 nm<λ<580 nm where N1 (λ) is the refractive index at the wavelength λ of the first layer of the adjoining layers, and N2 (λ) is the refractive index at the wavelength λ of the second layer of the adjoining layers, and vd1 and vd2 are the Abbe's numbers of the first and second layers; and (2) the boundary surface between the adjoining two layers has a phase difference structure in a trapezoid form having the parameters:

$$0.1 < a/\Lambda < 0.9,$$

$$\frac{\frac{1}{2} - \frac{4f\lambda Rd}{\Lambda}}{\frac{1}{2} - \frac{4f\lambda Bd}{\Lambda}} < \left(\frac{NR}{NB}\right)^2 < \frac{2 - \frac{4f\lambda Rd}{\Lambda}}{1 - \frac{4f\lambda Bd}{\Lambda}}$$

$$0.1 < b/\Lambda < 0.9,$$

where $\Lambda$ represents the phase grating cycle pitch, a represents the width of the top flat portion of the trapezoid, b represents the width of the bottom flat portion of the trapezoid, d represents a distance between the phase-grating filter and an image surface on an image pickup element, λR represents a representative wavelength of the red color wavelength band, λB represents a representative wavelength of the blue color wavelength band, NR represents the refractive index difference between the adjoining two layers at the representative wavelength of red color wavelength band, and NB represents the refractive index difference between the adjoining two layers at the representative wavelength of blue color wavelength band.

2. The wavelength-selective phase-grating optical low-pass filter as claimed in claim 1, wherein the phase difference structure between the adjoining two layers has an island-like form.

3. The wavelength-selective phase-grating optical low-pass filter as claimed in claim 1, wherein three layers are provided to form at least two boundary surfaces and wherein the three layers have therebetween two phase difference structures arranged perpendicular to each other in a check-like form to obtain a two-dimensional wavelength-selective optical low-pass effect.

4. The wavelength-selective phase-grating optical low-pass filter as claimed in claim 1, wherein the boundary surface between the adjoining two layers is filled with an adhesive resin material to connect the two layers.

* * * * *